United States Patent [19]

Watanabe

[11] Patent Number: 5,137,754
[45] Date of Patent: Aug. 11, 1992

[54] PROCESS FOR PREPARING FLUORINATED MATERIAL EMPLOYED IN A FUEL CELL

[75] Inventor: Masahiro Watanabe, No. 2-10, Kitashin 1-chome, Kofu-shi, Yamanashi, Japan

[73] Assignees: Tanaka Kikinzoku Kogyo K. K.; Masahiro Watanabe, both of Japan

[21] Appl. No.: 520,287

[22] Filed: May 7, 1990

[30] Foreign Application Priority Data

May 12, 1989 [JP] Japan .................................. 1-119824

[51] Int. Cl.⁵ .............................................. B05D 7/00
[52] U.S. Cl. .................................... 427/221; 427/214; 427/255.1; 427/115; 429/41; 429/44; 429/135
[58] Field of Search ..................... 427/391, 393.4, 352, 427/214, 220, 255.1, 115, 221; 429/135, 136, 41, 44

[56] References Cited

U.S. PATENT DOCUMENTS

| | | | |
|---|---|---|---|
| 4,144,374 | 3/1979 | Lagow et al. | 427/248.1 |
| 4,330,576 | 5/1982 | Dodd | 427/255.1 |
| 4,568,442 | 2/1986 | Goldsmith | 429/42 |
| 4,994,308 | 2/1991 | Taracon | 427/255.1 |

*Primary Examiner*—Michael Lusignan
*Assistant Examiner*—Diana L. Dudash
*Attorney, Agent, or Firm*—Klauber & Jackson

[57] ABSTRACT

A process for preparing hydrophobic material is disclosed which comprises applying a hydrocarbon polymer compound solution to the surface of material to be treated, vaporizing the solvent of the solution, and then fluorinating the polymer compound to coat the surface of the material to be treated with the fluorinated polymer compound.

4 Claims, No Drawings

PROCESS FOR PREPARING FLUORINATED MATERIAL EMPLOYED IN A FUEL CELL

BACKGROUND OF THE INVENTION

The present invention relates to a process for preparing hydrophobic material, more in particular to a process for easily providing hydrophobicity to almost the entire surface of material for forming, for example, a fuel cell.

DESCRIPTION OF BACKGROUND ART

The gas diffusion layer of a gas diffusion electrode for a fuel cell and the like consisting of a catalyst layer and a gas diffusion layer contacted thereto is formed by applying a mixture of, for instance, fine particles of carbon black and the like and of hydrophobic polytetrafluoroethylene (hereinafter referred to as "PTFE") or by adhering the PTFE on a carbon sheet and sintering it. Addition of plenty of the PTFE to the gas diffusion electrode is required for maintaining the ability of gas supply for a long period of time resulting in the lowering of the ability of gas supply due to the blockage of pores among the carbon black particles to bring about, when employed in a cell, the lowering of the cell performance.

On the other hand, the catalyst layer functions as gas passages and electrolyte passages, and a reaction gas supplied from the gas diffusion layer diffuses in the gas passage of the catalyst layer to be dissolved in the electrolyte being in contact with the gas passage so that an electrode reaction can be effected on the catalyst in the electrolyte.

When, however, the ability of gas supply is lowered in the catalyst layer because the electrolyte has permeated into the gas passage due to the working for a long period of time as observed in, for example, a phosphoric acid type fuel cell and the like, considerable lowering of the cell performance may result. Even if the amount of a hydrophobic agent is increased to prevent this lowering, the electrolyte is difficult to be permeated into the catalyst layer so that the catalyst cannot participate in a reaction which results also in lowering of the cell performance.

In order to overcome these drawbacks, the present inventor has proposed a process for providing hydrophobicity wherein on almost all the surface of fine particles or fine fibers is coated with synthesized hydrophobic fine particles of which an average particle size is not greater than that of the fine particles or the fine fibers prepared by direct polymerization of the corresponding monomer (U.S. patent application Ser. No. 07/500,418, pending).

Since almost all the surface of the hydrophobic material prepared by the process is coated with the polymerized hydrophobic particles, the material possesses excellent properties and characteristics so that the electrolyte does not permeate. Since, however, the process requires an operation in which the monomer of the hydrophobic particles is polymerized on the surface of hydrophobic material, which is somewhat difficult to be performed, the present inventor has investigated a process for providing the hydrophobicity to the material by means of an easier operation to reach the present invention.

SUMMARY OF THE INVENTION

Accordingly, it is an object of the invention to provide a process for preparing hydrophobic material, in other words, for providing hydrophobicity to the material.

It is another object of the invention to provide a process for preparing hydrophobic material suitable for use in a fuel cell.

It is a further object of the invention to provide a process for preparing hydrophobic material possessing excellent performance by means of a simpler method.

In accordance with the present invention, a process for preparing hydrophobic material is provided which comprises applying a hydrocarbon polymer compound solution to the surface of material to be treated, vaporizing the solvent of the solution, and then fluorinating the polymer compound to coat the surface of the material to be treated with the fluorinated polymer compound.

In providing hydrophobicity to the material to be treated, the present invention contemplates applying a hydrocarbon polymer compound solution to the surface of the material to be treated, and then fluorinating the polymer compound to coat the surface of the material to be treated with the fluorinated polymer compound so that the hydrophobic treatment of the material to be treated can be attained.

Since such a polymer compound as polyethylene, polypropylene and the like coats the surface of the thus hydrophobically treated material and then is fluorinated, the coating layer is almost uniformly formed on the entire surface of the material to be treated.

Accordingly, even if the hydrophobically treated material is employed as an anode of a fuel cell for a long period of time, electrolyte does not permeate through the portions where no hydrophobic coating is formed and the gas supply is not lowered due to the blockage of the gas flow.

Since the hydrophobic treatment can be carried out economically according to the invention, the process of this invention can be applied to the surface treatment of an industrial reaction apparatus and other utensils for daily use.

DESCRIPTION OF PREFERRED EMBODIMENTS

The present invention will now be described in detail with reference to its preferred embodiments.

Instead of the above mentioned prior process of the present inventor which comprises polymerizing the monomer on the surface of the treated material to form the polymerized hydrophobic coating, the present invention is characterized in that the hydrophobicity is elevated by applying a solution of a hydrocarbon polymer compound already polymerized to the surface of material to be treated and by vaporizing the solvent of the solution followed by fluorinating the polymer compound.

The object to which hydrophobicity is provided according to the present invention includes, for example, carbon black and carbon paper employed for electrode material of a fuel cell, other carbon plates and a metal manifold for the fuel cell stack or the like, and the invention is further applicable to the anti-corrosion treatment of the inner surface of an industrial reaction apparatus, and the anti-corrosion and hydrophobicity treatment of a utensil of daily use.

Therefore, the above materials may be employed as the material to be treated. The forms of the material are not restricted, and such forms as particulate, sheet, plate, cylindrical or the like may be employed.

Although the hydrocarbon polymer compound is not especially restricted so long as it is soluble in a solvent, polymers such as polyethylene, polypropylene and the like, or the copolymer of their monomers is conveniently employed from the standpoint of solubility and cost. Although the solvent is not especially restricted so long as it dissolves the said compound, a hydrocarbon solvent such as heptane is preferably employed.

The method for coating the material to be treated with the hydrocarbon polymer compound dissolved in the solvent is not especially restricted. The solution may be applied by brushing or spraying, or the material to be treated itself may be dipped in the solution. The solvent is then vaporized from the solution layer formed on the surface by means of heat drying or air drying to form a coating layer of the said compound. The thickness of the coating layer is preferably not more than 0.1 $\mu$m from the standpoint of economy and permeability. If a sufficient thickness cannot be obtained by one coating and drying operation, a plurality of similar operations may be repeated.

Fluorine gas is then introduced to the surface of the material to be treated on which the coating layer of the hydrocarbon polymer compound has been formed, to fluorinate the hydrogen atoms of the compound to obtain the high hydrophobicity. The fluorine gas to be introduced is more effectively employed for fluorinating after dilution with an inert gas, such as argon, from the standpoint of controlling the reaction because the reactivity of the fluorine gas is extremely high. The fluorinating reaction may be performed under heat, but generally the fluorinating reaction sufficiently proceeds when the fluorine gas is introduced at room temperature.

All the hydrogen atoms of the hydrocarbon polymer compound are not required to be substituted by fluorine, and usually about 50% of substitution provides the necessary hydrophobicity. However, nearly 100% substitution is desirable from the standpoint of anticorrosion.

On the material constituting a fuel cell or other elements or the like hydrophobically treated according to the process of this invention, is almost uniformly formed a coating layer because the polymer compound dissolved in the solution is applied onto the surface, so that all the surface possesses almost uniform hydrophobicity. Accordingly, even if the hydrophobically treated material is employed as an anode of a fuel cell for a long period of time, an electrolyte does not permeate through the portions where no hydrophobic coating is formed and the ability of gas supply is not lowered due to the blockage of the gas flow.

Since the hydrophobic treatment can be carried out according to the invention economically, the process of this invention can be applied to the surface treatment of an industrial reaction apparatus and other utensils of daily use.

Although the present invention will be described in detail with reference to the following Examples in connection with glassy carbon which is the material for a fuel cell, a carbon paper substrate of a gas diffusion electrode and carbon black, respectively, the present invention shall not be limited thereto.

EXAMPLE 1

3g of polyethylene of which the average molecular weight was 250,000 was dissolved in 100 ml of heptane to form a film-forming solution.

After a commercially available carbon paper substrate (100 mm in length, 100 mm in width, 0.4 mm in thickness, 15 $\mu$m of average particle diameter) was dipped in the film-forming solution, operations of vaporizing the heptane were repeated to form 5 weight % of a polyethylene coat based on the substrate. After the substrate was put in a reactor made of stainless, fluorine gas diluted to 10% with argon was introduced into the reactor for 30 minutes at room temperature to fluorinate the polyethylene to obtain a hydrophobic substrate.

COMPARATIVE EXAMPLE

As a control comparison, the same carbon paper substrate described above was impregnated with a dispersing agent consisting of a solvent and PTFE dispersed therein, so that 5% of the PTFE based on the substrate was deposited. The substrate was then heat treated for 30 minutes at 330° C. to obtain a hydrophobic material.

Both hydrophobic substrates were set afloat on 100% phosphoric acid and the temperature was maintained at 200° C. for 50 hours. The substrate of the Example continued floating while the phosphoric acid penetrated into the substrate of the Comparative Example to sink the substrate.

EXAMPLE 2

The film-forming solution of Example 1 diluted with heptane was applied to the surface of commercially available glassy carbon until the film thickness became 0.2 $\mu$m. After the removal of the heptane by vaporization, the glassy carbon was put in a reactor made of stainless, fluorine gas diluted to 5% with argon was introduced into the reactor for 30 minutes to react the fluorine gas with the glassy carbon to obtain a hydrophobic glassy carbon.

The hydrophobic carbon thus formed exhibited strong hydrophobicity of which an angle of contact reached 110° which is close to 118°, an officially announced value. ESCA surface analysis confirmed the formation of a fluorine compound.

EXAMPLE 3

The film-forming solution of Example 1 was added to commercially available carbon black (specific surface area was 250 m$^2$/g) and dried to form 10 weight % of a polyethylene coat. After the carbon black was put in a reactor made of stainless, fluorine gas diluted to 3% with argon was introduced into the reactor for one hour at room temperature and then fluorine gas diluted to 10% was introduced for two hours to fluorinate the carbon black to obtain hydrophobic carbon black.

What is claimed is:

1. A process for preparing fluorinated particulate material employed in a fuel cell which comprises applying a solution of a hydrocarbon polymer compound in a solvent to the surface of a particulate material to be treated, vaporizing the solvent of the solution, and fluorinating the polymer compound to coat the surface of the particulate material to be treated with the fluorinated polymer compound.

2. A process for preparing a fluorinated material in accordance with claim 1, wherein the polymer compound is polyethylene, polypropylene, or the copolymer of ethylene and propylene.

3. A process for preparing a fluorinated material in accordance with claim 1, wherein the solvent is a hydrocarbon.

4. A process for preparing a fluorinated material in accordance with claim 1, wherein the fluorinating is performed employing fluorine diluted with an inert gas.

* * * * *